United States Patent
Okuda et al.

(10) Patent No.: US 12,296,825 B2
(45) Date of Patent: May 13, 2025

(54) VEHICLE CONTROL DEVICE

(71) Applicant: TOYOTA JIDOSHA KABUSHIKI KAISHA, Toyota (JP)

(72) Inventors: Koichi Okuda, Toyota (JP); Masafumi Yamamoto, Nagakute (JP); Yuuki Makino, Aichi-gun (JP); Yoshito Sekiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 18/188,570

(22) Filed: Mar. 23, 2023

(65) Prior Publication Data

US 2023/0311876 A1    Oct. 5, 2023

(30) Foreign Application Priority Data

Mar. 29, 2022   (JP) ................. 2022-054458

(51) Int. Cl.
*B60W 30/16*   (2020.01)
*B60W 40/13*   (2012.01)
*G05D 1/00*    (2024.01)

(52) U.S. Cl.
CPC ........... *B60W 30/16* (2013.01); *B60W 40/13* (2013.01); *G05D 1/0295* (2013.01); *B60W 2554/80* (2020.02); *B60W 2556/45* (2020.02)

(58) Field of Classification Search
CPC .. B60W 30/16; B60W 40/13; B60W 2554/80; B60W 2556/45; B60W 30/165; G05D 1/0295; G05D 1/0217; G05D 1/0293; G08G 1/22

See application file for complete search history.

(56) References Cited

U.S. PATENT DOCUMENTS 9,396,661 B2 *   7/2016   Okamoto ............... G08G 1/22
10,017,039 B1 *  7/2018   Colavincenzo ....... B60W 10/06
(Continued)

FOREIGN PATENT DOCUMENTS

JP    H101036 A   *   1/1998
JP    2012-43444 A       3/2012
(Continued)

*Primary Examiner* — Phutthiwat Wongwian
*Assistant Examiner* — Brian R Kirby
(74) *Attorney, Agent, or Firm* — Oblon, McClelland, Maier & Neustadt, L.L.P.

(57) ABSTRACT

A vehicle control device connecting platoon participating vehicles to one another via radio communication, to control platooning of the platoon participating vehicles, the platoon participating vehicle includes a leading vehicle and following vehicles that perform automatic follow-up running in line with a predetermined intervehicle distance from the leading vehicle, During execution of the platooning, the vehicle control device acquires, for each of the platoon participating vehicles, information of an estimated value of retardation based on a driven torque generated when coasting solely in its current vehicle state, the vehicle control device controls the driven torque of each of the platoon participating vehicles so that the platoon participating vehicles align in ascending order of the estimated value of retardation increasing rearward in sequence from the leading vehicle.

7 Claims, 9 Drawing Sheets

(56) References Cited

U.S. PATENT DOCUMENTS

| | | | | |
|---|---|---|---|---|
| 2001/0001138 A1* | 5/2001 | Zhu | ................ | B60T 8/172 |
| | | | | 702/175 |
| 2013/0041567 A1* | 2/2013 | Yamashiro | ............ | B60T 7/22 |
| | | | | 701/96 |
| 2014/0316671 A1* | 10/2014 | Okamoto | ............ | G08G 1/22 |
| | | | | 701/96 |
| 2016/0054735 A1* | 2/2016 | Switkes | ............ | G05D 1/0217 |
| | | | | 701/23 |
| 2017/0344023 A1* | 11/2017 | Laubinger | ............ | B60W 30/165 |
| 2018/0050697 A1* | 2/2018 | Kuszmaul | ............ | B60W 40/1005 |
| 2018/0066753 A1* | 3/2018 | Zhao | ............ | B60W 20/00 |
| 2019/0084540 A1* | 3/2019 | Kasper | ............ | B60T 8/176 |
| 2020/0384995 A1* | 12/2020 | Bang | ............ | B60W 30/18072 |

FOREIGN PATENT DOCUMENTS

| | | | |
|---|---|---|---|
| JP | 2012-108797 A | 6/2012 | |
| JP | 2015-22423 A | 2/2015 | |
| JP | 2019-101677 A | 6/2019 | |
| WO | WO-2018043753 A1 * | 3/2018 | ........ B60W 30/165 |

* cited by examiner

FIG.4

|     | C1 | C2 | C3 | B1 | B2  | F1 |
|-----|----|----|----|----|-----|----|
| 1st | O  |    |    |    | (O) | O  |
| 2nd | O  |    |    | O  |     |    |
| 3rd | O  | O  |    |    |     |    |
| 4th |    | O  |    | O  |     |    |
| Rev |    |    | O  |    | O   |    |
| N   |    |    |    |    |     |    |

(O: ENGAGED BLANK: RELEASED)

VEHICLE CONTROL DEVICE

This application claims priority from Japanese Patent Application No. 2022-054458 filed on Mar. 29, 2022, the disclosure of which is herein incorporated by reference in its entirety.

TECHNICAL FIELD

The present invention relates to a vehicle control device that controls platooning of platoon participating vehicles including a leading vehicle and following vehicles.

BACKGROUND ART

A vehicle control device is well known that connects, via radio communication, platoon participating vehicles to one another to control platooning of the platoon participating vehicles, the platoon participating vehicles including a leading vehicle and following vehicles that perform automatic follow-up running in line with a predetermined intervehicle distance. One example is a platooning control device described in Patent Document JP201243444A. The document discloses determining vehicles forming a platoon, based on a running plan for controlling the vehicle velocity at a target vehicle velocity by alternately repeating acceleration running and deceleration running or coasting.

SUMMARY OF THE INVENTION

In the case of running so as to keep the vehicle velocity during platooning, the intervehicle distance between the platoon participating vehicles may become short due to the difference in running resistance between the platoon participating vehicles at the time of inertia running i.e. coasting slowed down haphazardly with zero demanded driving torque for example.

The present invention was conceived in view of the above circumstances, and an object thereof is to provide a vehicle control device capable of suppressing the reduction of the intervehicle distance between the platoon participating vehicles at the time of coasting during platooning.

The object indicated above is achieved according to the following aspects of the present invention.

According to a first aspect of the invention, there is provided a vehicle control device connecting platoon participating vehicles to one another via radio communication, to control platooning of the platoon participating vehicles, the platoon participating vehicle includes (a) a leading vehicle and following vehicles that perform automatic follow-up running in line with a predetermined intervehicle distance from the leading vehicle, (b) during execution of the platooning, the vehicle control device acquires for each of the platoon participating vehicles, information of an estimated value of retardation based on a driven torque generated when coasting solely in its current vehicle state, the vehicle control device controls the driven torque of each of the platoon participating vehicles so that the platoon participating vehicles align in ascending order of the estimated value of retardation increasing rearward in sequence from the leading vehicle.

According to a second aspect of the invention, in the vehicle control device according to the first aspect of the invention, the platoon participating vehicle comprises an engine as a power source and an automatic transmission transmitting power of the engine to driving wheels, the vehicle control device controls the driven torque obtained from engine braking caused by friction of the engine, by changing a gear ratio of the automatic transmission.

According to a third aspect of the invention, in the vehicle control device according to the first and the second aspects of the invention, the platoon participating vehicle comprises a rotator as a power source, the vehicle control device controls the driven torque obtained from regenerative braking caused by regenerative operation of the rotator, by changing amount of regeneration of the rotator.

According to a fourth aspect of the invention, in the vehicle control device according to any one of the first through third aspects of the invention, the vehicle control device acquires information of the estimated value of retardation that takes account of difference in air resistance occurring from order in which the platoon participating vehicles align.

According to a fifth aspect of the invention, in the vehicle control device according to any one of the first through fourth aspects of the invention, prior to execution of the platooning, the vehicle control device figures out the estimated value of retardation that is based on the driven torque of each of the platoon participating vehicles.

According to a sixth aspect of the invention, in the vehicle control device according to any one of the first through fifth aspects of the invention, based on vehicle weight, the vehicle control device figures out the estimated value of retardation that is based on the driven torque of each of the platoon participating vehicles.

According to a seventh aspect of the invention, in the vehicle control device according to any one of the first through sixth aspects of the invention, the vehicle control device brings control of the driven torque to an end in case that, as a result of the control of the driven torque, an intervehicle distance between any ones of the platoon participating vehicles exceeds a predetermined end determination threshold value greater than the predetermined intervehicle distance.

In the vehicle control device according to the first aspect of the invention, while platooning is in execution, for each of the platoon participating vehicles, there is acquired information of the estimated retardation based on the driven torque occurring when the vehicle coasts solely in the current vehicle state, and the driven torque of each of the platoon participating vehicles is controlled so that the alignment order of the platoon participating vehicles becomes ascending order of the estimated retardation in sequence from the leading vehicle, whereby the actual retardation is restrained from decreasing even though the following vehicle can have an air resistance smaller than that of the preceding vehicle. It is thus possible to restrain the intervehicle distance between the platoon participating vehicles from becoming short at the time of coasting during platooning.

In the vehicle control device according to the second aspect of the invention, in the platoon participating vehicle including the engine and the shift unit, the driven torque obtained by engine braking is controlled by changing the gear ratio of the shift unit, whereupon the driven torque can easily be controlled so that the alignment order of the platoon participating vehicles becomes ascending order of the estimated retardation in sequence from the leading vehicle.

In the vehicle control device according to the third aspect of the invention, in the platoon participating vehicle including the rotator, the driven torque obtained by regenerative braking is controlled by changing the amount of regeneration of the rotator, whereupon the driven torque can easily be controlled so that the alignment order of the platoon participating vehicles becomes ascending order of the estimated retardation in sequence from the leading vehicle.

In the vehicle control device according to the fourth aspect of the invention, information of the estimated retardation is acquired that takes account of the difference in the air resistance arising from the alignment order of the platoon participating vehicles, the actual retardation is further restrained or prevented from diminishing even if the following vehicle has a smaller air resistance than the preceding vehicle has.

In the vehicle control device according to the fifth aspect of the invention, since the estimated retardation based on the driven torque of each of the platoon participating vehicles is calculated prior to the execution of platooning, the platoon can be formed considering the changeable range of the driven torque when starting the platoon. This facilitates the driven torque control allowing the alignment order of the platoon participating vehicles to become ascending order of the estimated retardation in sequence from the leading vehicle.

In the vehicle control device according to the sixth aspect of the invention, since the estimated retardation based on the driven torque of each of the platoon participating vehicles is calculated on the basis of the vehicle weight, the estimated retardation of each of the platoon participating vehicles is properly figured out corresponding to the passenger weight.

In the vehicle control device according to the seventh aspect of the invention, if as a result of the driven torque regulation control, the intervehicle distance between any ones of the platoon participating vehicles has exceeded the predetermined end determination threshold value, the driven torque regulation control is brought to an end, whereupon when reaching the situation where the reduction of the intervehicle distance between the platoon participating vehicles is avoided, the intervehicle distance is restrained from becoming further longer.

BRIEF DESCRIPTION OF DRAWINGS

FIG. 4 is an engagement actuation table showing relationships between a plurality of gear stages of a shift unit disposed in the power transmission device for HEV of FIG. 3 and control states of engagement devices for establishing the gear stages.

EMBODIMENTS

Figure 1:
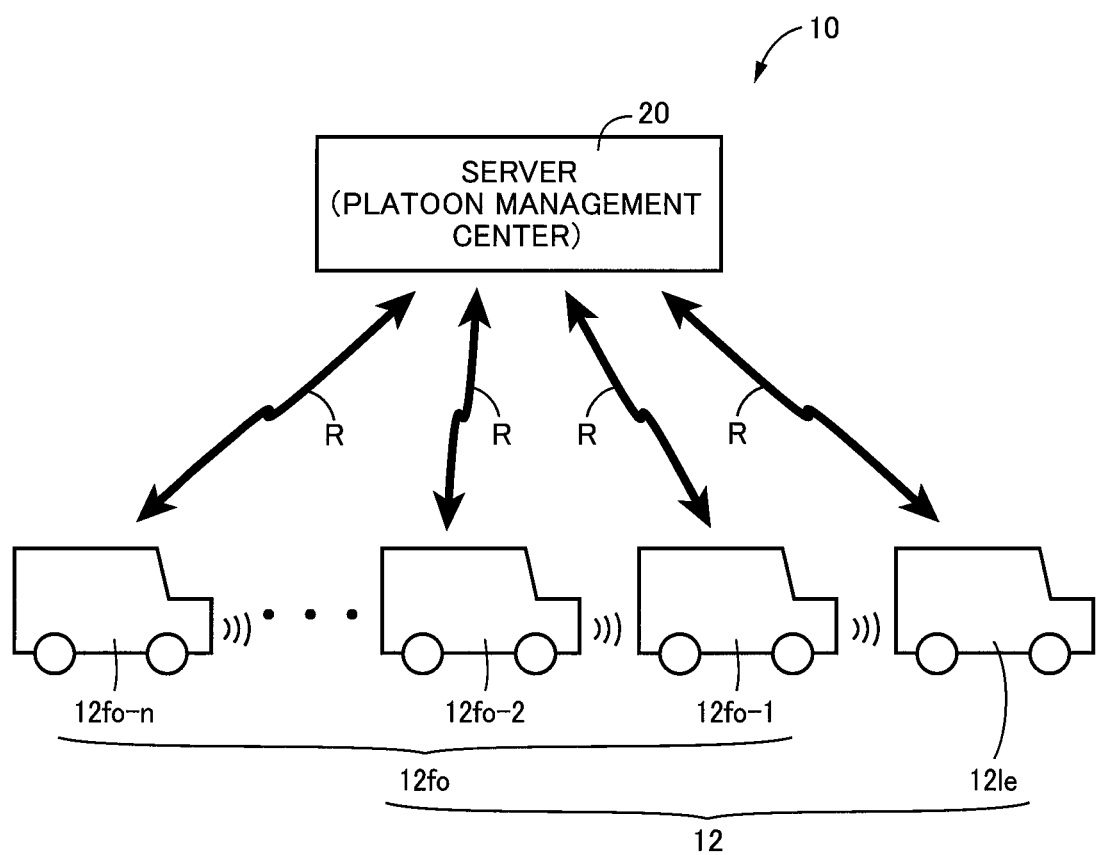
FIG. 1 is a schematic view explaining a fundamental configuration of a platooning system that is an embodiment of the present invention.

In embodiments of the present invention, the platoon participating vehicles are various types of vehicles that have hitherto been used, such as e.g. engine driven vehicles, electrically powered cars, or hybrid electromotive vehicles each having an engine and a rotator as power sources. The engine is an internal combustion engine such as e.g. a gasoline engine or a diesel engine. When coasting for example, the engine can provide engine braking by friction of the engine. The rotator is, for example, a motor generator capable of being used selectively as an electric motor or a generator. The motor generator functions as a power source when used as the electric motor, and can provide regenerative braking when used as the generator. The rotator may be, for example, an electric motor not having the function of the generator.

A hydrodynamic power transmission device such as a torque converter, if necessary, is disposed on a power transmission path between the power source and the automatic transmission. The hydrodynamic power transmission device may be left out depending on the power source. For example, on the power transmission path between the power source and the automatic transmission, there may be disposed an electric differential unit with a planetary gear drive and a rotator for differential control, a friction-engagement starting clutch, etc. The automatic transmission is a stepped transmission of e.g. planetary gear type or biaxial meshing type, but may be a continuously variable transmission of e.g. belt type having a stepwise controlled gear ratio like the stepped transmission.

The vehicle control devices are control devices used for vehicles. All or some of the vehicle control devices can be built in servers disposed in e.g. a head office, sales offices, or any other places of a transport company or the like that manages the platoon participating vehicles. All or some of the vehicle control devices may be mounted on e.g. the platoon participating vehicles, or some of control functions such as shift control shifting the automatic transmission may be incorporated in in-vehicle control devices. The platoon participating vehicles are configured including e.g. one leading vehicle and a plurality of following vehicles. The platoon participating vehicles may consist of e.g. a total of two vehicles i.e. one leading vehicle and one following vehicle. Running by the platoon participating vehicles includes manned running in which a vehicle runs with the driver on board and unmanned running in which a vehicle runs without the driver on board by using e.g. an automatic steering system that allows running along a previously defined running route. Control of the platooning by the vehicle control device may be carried out via radio communication between the server and each of the platoon participating vehicle, or may be performed via radio communication e.g. vehicle-to-vehicle communication between the platoon participating vehicles.

The following vehicle has a function of follow-up running with a predetermined intervehicle distance. That is, the vehicle control device figures out a drive demand amount necessary for performing the follow-up running with the intervehicle distance between the following vehicle and the preceding vehicle being kept at a previously defined target intervehicle distance, and controls the output of the power source so as to obtain the drive demand amount, to thereby execute the follow-up running control that allows follow-up running with the target intervehicle distance. It is desirable that in addition to the follow-up running control, the leading vehicle can execute autonomous running control that allows running at a predetermined target vehicle velocity, by calculating a drive demand amount necessary for running at a previously defined target vehicle velocity and controlling the output of the driving force source so as to obtain the drive demand amount. The autonomous running control may be control for constant velocity running that runs at a constant target vehicle velocity, or may be control for automatically running while varying the vehicle velocity depending on the target vehicle velocity that is sequentially variably set along the running route. The following vehicle may also be capable of autonomous running control, similar to the leading vehicle. That is, there is no need to functionally distinguish the leading vehicle from the following vehicle, and it is desirable to enable optional participation in a platoon as the leading vehicle or the following vehicle. The output control of the power source in the follow-up running control and the autonomous running control is desirably effected including a negative torque that arises from e.g. the engine braking or regenerative control of the rotator, and the braking force control may be effected via the automatic braking system. The leading vehicle may run controlling the output of the power source depending on the driver's acceleration/deceleration operation. Although also in the leading vehicle, shifting of the automatic transmission is managed by the vehicle control device, e.g. a guide vehicle or the like shifting the automatic transmission depending on the manual operation may be disposed in front of the leading vehicle.

The platoon participating vehicles may include plural types of vehicles having respective automatic transmissions differing in the number of gear stages, but may include only vehicles having one type of automatic transmissions with the same number of gear stages. At the time of platooning, the platoon participating vehicles need not necessarily have shifting timing set for platooning, and may apply shifting timing for solo running intactly to platooning.

The gear ratio of the automatic transmission is "input rotary member rotation number/output rotary member rotation number". The high gear ratio of the automatic transmission is a high vehicle speed gear ratio with smaller gear ratio. The low gear ratio of the automatic transmission is a low vehicle speed gear ratio with larger gear ratio. For example, the lowest gear ratio is a lowest vehicle speed gear ratio on the lowest vehicle speed side, and is a maximum gear ratio with largest gear ratio.

Embodiments of the present invention will hereinafter be described in detail with reference to the drawings.

First Embodiment

FIG. 1 is a schematic view explaining a basic configuration of a platooning system 10 that is an embodiment of the present invention. In FIG. 1, the platooning system 10 is configured including platoon participating vehicles 12 and a server 20 acting as a platoon management center. Such platooning is performed mainly on e.g. freeways and other automobile-only roads. The platoon participating vehicles 12 include a plurality of platoon participating vehicles $12_{le}$, $12_{fo\text{-}1}$, $12_{fo\text{-}2}$, . . . , and $12_{fo\text{-}n}$. The platoon participating vehicle $12_{le}$ is a leading vehicle of the platoon. The platoon participating vehicles $12_{fo\text{-}1}$, $12_{fo\text{-}2}$, . . . , and $12_{fo\text{-}n}$ are following vehicles that automatically follow the leading vehicle $12_{le}$ in one line with a predetermined intervehicle distance, with reference numerals $12_{fo\text{-}1}$, $12_{fo\text{-}2}$, . . . , and $12_{fo\text{-}n}$ being imparted to the following vehicles in order from the leading side. In this embodiment, when not particularly distinguished, the platoon participating vehicles $12_{fo\text{-}1}$, $12_{fo\text{-}2}$, . . . , and $12_{fo\text{-}n}$ are referred to as following vehicles $12_{fo}$, and the leading vehicle $12_{le}$ and the following vehicles $12_{fo}$ are referred to as platoon participating vehicles 12. The server 20 is, for example, an electronic control device such as a personal computer. For example, the server 20 may be disposed in a head office, sales offices, etc. of a company to which the platoon participating vehicles 12 belong, or may be disposed in commercial facilities, etc.

Figure 2:
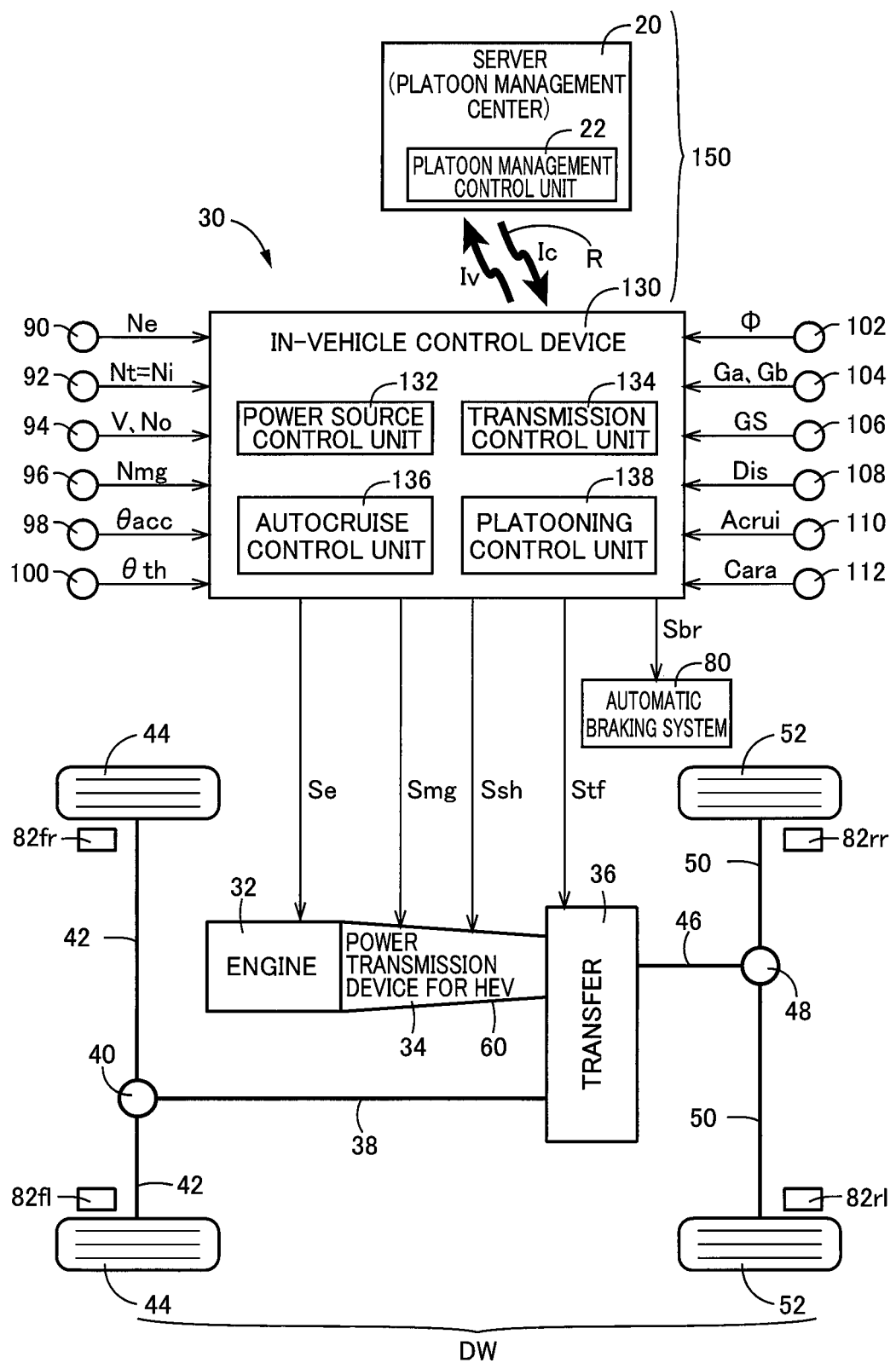
FIG. 2 is a diagram explaining an example of a vehicle that can be used as a platoon participating vehicle of FIG. 1, and is a diagram showing control functions for various controls and a principal part of a control system, together with a schematic view of a drive system.

FIG. 2 is a diagram explaining an example of a vehicle 30 that can join a platoon as a platoon participating vehicle 12 of FIG. 1, and is a diagram showing control functions for various controls and a principal part of a control system, together with a schematic view of a drive system. In FIG. 2, the vehicle 30 is an ordinary vehicle capable of not only platooning but also solo running, and includes an in-vehicle control device 130. In the case where the vehicle 30 joins a platoon as the platoon participating vehicle 12, the in-vehicle control device 130 of each platoon participating vehicle 12 and the server 20 are connected to each other via a radio communication R network such as mobile phone network, wireless LAN network, or the Internet (see FIG. 1), enabling transmission and reception of various pieces of information. In the case where the vehicle 30 joins a platoon as the platoon participating vehicle 12, the in-vehicle control devices 130 of the platoon participating vehicles 12 may be connected to each other via radio communication e.g. vehicle-to-vehicle communication between the platoon participating vehicles 12.

The in-vehicle control devices 130 and the server 20 are each configured to include a so-called microcomputer having a CPU, a RAM, a ROM, an I/O interface, etc., the CPU performing various types of signal processing in accordance with a program previously stored in the ROM while utilizing the temporary storage function of the RAM, thereby rendering it possible to execute various controls. The in-vehicle control devices 130 and the server 20 are vehicle control devices 150 connecting the platoon participating vehicles 12 to each other via the radio communication R to control platooning of the platoon participating vehicles 12.

The vehicle 30 is a front and rear wheel drive (four-wheel drive) hybrid electromotive vehicle based on a front engine rear wheel (FR) drive system. The vehicle 30 includes an engine 32, a power transmission device 34 for hybrid electric vehicle (HEV) coupled to the engine 32, and a transfer 36 coupled to the power transmission device 34 for HEV. A front propeller shaft 38 and a rear propeller shaft 46 are each connected to the transfer 36. Power transmitted from the engine 32 and the power transmission device 34 for HEV to the transfer 36 is distributed via the transfer 36 to the front propeller shaft 38 and the rear propeller shaft 46. Power distributed to the front propeller shaft 38 is transmitted via a front-wheel-side differential gear 40 and left and right front-wheel drive shafts 42 to left and right front wheels 44. Power distributed to the rear propeller shaft 46 is transmitted via a rear-wheel-side differential gear 48 and left and right rear-wheel drive shafts 50 to left and right rear wheels 52. The rear wheels 52 are main driving wheels that act as driving wheels in both the cases of two-wheel drive (2WD) running and four-wheel drive (4WD) running. The front wheels 44 are sub-driving wheels that act as driven wheels during 2WD running and that act as driving wheels during 4WD running.

The engine 32 is an internal combustion engine such as a gasoline engine or a diesel engine and is used as a power source for running. In the engine 32, engine control equipment not shown having a throttle actuator, a fuel injector, an ignitor, etc. is controlled by the in-vehicle control device 130, so that an engine torque $T_e$ as an output torque of the engine 32 is controlled. When rotationally driven by power input from the driving wheel DW side during coasting for example, the engine 32 can provide engine braking by friction.

Figure 3:
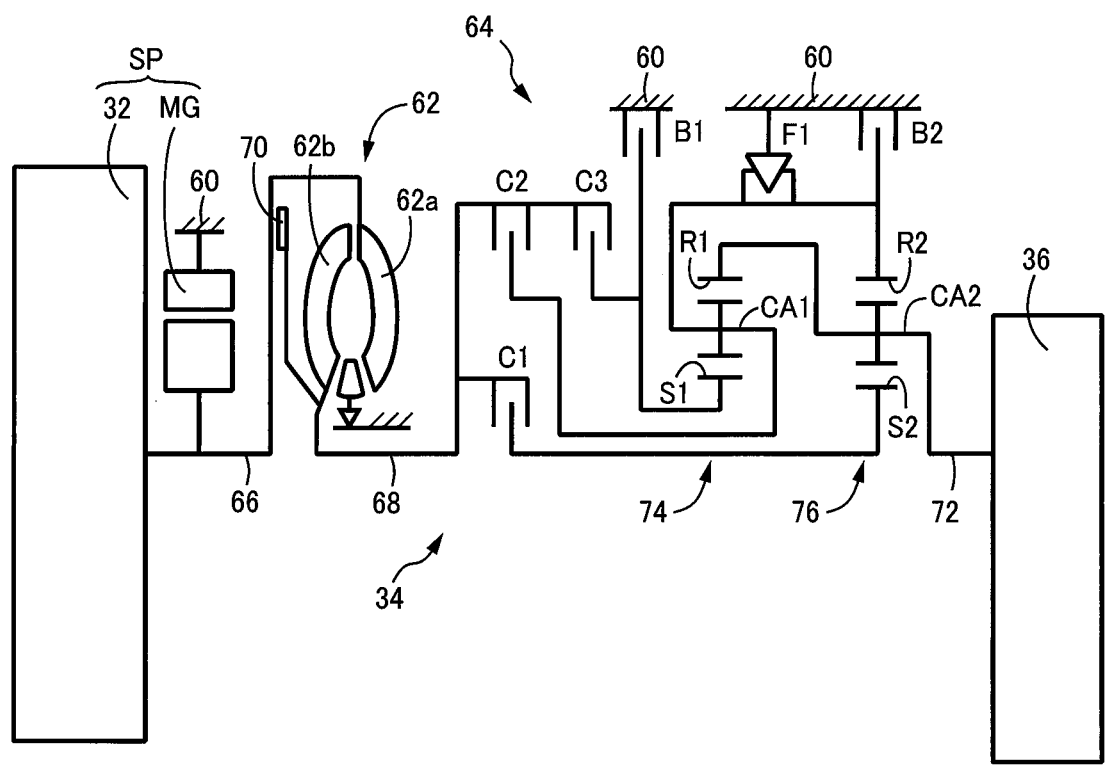
FIG. 3 is a skeleton diagram explaining a specific example of a power transmission device for HEV of FIG. 2.

FIG. 3 is a skeleton diagram explaining a specific example of the power transmission device 34 for HEV. In FIG. 3, the power transmission device 34 for HEV includes: a rotator MG arranged within a transmission case 60 as a non-rotating member attached to a vehicle body; and a shift unit 64 coupled via a torque converter 62 to the rotator MG and the engine 32. The power transmission device 34 for HEV includes an MG coupling shaft 66. These rotator MG, torque converter 62, and the shift unit 64 are each configured substantially symmetrically about a center line, but in the skeleton diagram of FIG. 3 the lower half with respect to the center line is omitted. Hereinafter, the transmission case 60 will be referred to as case 60.

The rotator MG is a motor generator, for example, a three-phase AC synchronous motor, having both an electric motor function to generate mechanical power from electric power and a generator function to generate electric power from mechanical power. In the rotator MG, MG torque $T_{mg}$ i.e. the torque of the rotator MG and MG rotation number $N_{mg}$ i.e. the rotation speed of the rotator MG are controlled by the in-vehicle control device 130. The rotator MG is coupled to the MG coupling shaft 66 in a power transmittable manner. That is, the rotator MG is coupled to a power transmission path between the engine 32 and the torque converter 62 in a power transmittable manner. The rotator MG is used as a power source SP to generate power for running in replacement of the engine 32 or in addition to the engine 32. The rotator MG is regeneratively controlled to function as a generator to generate power when rotationally driven by power of the engine 32 or power input from the driving wheel DW side, and generates regenerative braking by regenerative operation in the case of being coupled to the driving wheels DW. The rotator MG is coupled directly or via a damper not shown, etc. to a crankshaft of the engine 32. Between the rotator MG and the engine 32, there may be disposed an engine connection/disconnection clutch or the like for enabling/disabling the power transmission.

The torque converter 62 includes a pump blade wheel 62a coupled via the MG coupling shaft 66 to the rotator MG, and a turbine blade wheel 62b coupled to an input shaft 68 of the shift unit 64. The torque converter 62 includes an LU clutch 70 as a publicly known lockup clutch that couples the pump blade wheels 62a and turbine blade wheel 62b together.

The shift unit 64 intervenes on the power transmission path between the torque converter 62 and the transfer 36. An output shaft 72 of the shift unit 64 is coupled to the transfer 36. The shift unit 64 is an automatic transmission that transmits power of the power source SP to the driving wheels DW.

The shift unit 64 is a publicly known planetary gear type stepped automatic transmission that includes plural sets of planetary gear drives consisting of e.g. a first planetary gear drive 74 and a second planetary gear drive 76, and a plurality of engagement devices including a one-way clutch F1, clutches C1 to C3, and brakes B1 and B2. Hereinafter, the clutches C1 to C3 and the brakes B1 and B2 are referred to simply as engagement devices CB, if not particularly distinguished.

The engagement devices CB are publicly known hydraulic friction engagement devices each including a multi-plate type or single-plate type clutch and brake pressed by a hydraulic actuator and a band brake acted on by the hydraulic actuator. In each of the engagement devices CB, the operation state i.e. control state such as engagement state or release state is switched by changing a CB torque $T_{cb}$ that is a torque capacitance thereof, through the control by the in-vehicle control device of a CB oil pressure $PR_{cb}$ that is an oil pressure on the engagement device CB supplied from an oil pressure control circuit not shown.

In the shift unit 64, rotating elements of the first planetary gear drive 74 and the second planetary gear drive 76 are partially coupled to each other or are coupled to the input shaft 68, the case 60, or the output shaft 72, directly or indirectly via the engagement devices CB and the one-way clutch F1. The rotating elements of the first planetary gear drive 74 are a sun gear S1, a carrier CA1, and a ring gear R1, while the rotating elements of the second planetary gear drive 76 are a sun gear S2, a carrier CA2, and a ring gear R2.

The shift unit 64 is a stepped transmission in which a plurality of variable speed levels (referred to also as gear stages) GS each having a different variable speed ratio (referred to also as gear ratio) γ (=input rotation number $N_i$/output rotation number $N_o$) are selectively formed when any of the engagement devices CB is engaged. In the shift unit 64, the gear stages GS formed in response to an accelerator operation of the driver (=operator), a vehicle velocity V, etc. are switched by the in-vehicle control device 130. The input rotation number $N_i$ is the rotation number of the input shaft 68 and is the input rotation number of the shift unit 64, the input rotation number $N_i$ being equal to a turbine rotation number $N_t$ that is the rotation number of a turbine shaft rotationally driven by the turbine blade wheel 62b. The output rotation number $N_o$ is the rotation number of the output shaft 72 and is the output rotation number of the shift unit 64.

In the shift unit 64, as shown in an actuation engagement table of FIG. 4 for example, the plurality of gear stages GS are formed that include forward four speeds of a first gear stage ("$1^{st}$" in the diagram) to a fourth gear stage ("$4^{th}$" in the diagram) and a reverse gear stage ("Rev" in the diagram). The first gear stage has a largest gear ratio γ, while higher gear stages GS on the fourth gear stage side capable of high velocity running have smaller gear ratio γ. The actuation engagement table of FIG. 4 is a table putting together the relationships between the gear stages GS and the control states of the engagement devices CB. In FIG. 4, "○" represents the engaged state, parenthesized "(○)" represents the engaged state during coast downshifting of the shift unit 64, and blank represents the released state. When a gear stage GS is formed in the shift unit 64, the shift unit 64 enters the state enabling power transmission, i.e., the power transmittable state. The neutral state ("N" in the diagram) of the shift unit 64 is the state where the shift unit 64 cannot transmit power, i.e., the state disabling power transmission, and is implemented, for example, by cutting off the power transmission in the shift unit 64 with all the engagement devices CB released.

Referring back to FIG. 2, the transfer 36 includes, for example: a sub transmission that shifts in two stages, high (transfer Hi) and low (transfer Lo), rotation transmitted from the output shaft 72 of the shift unit 64; a distribution mechanism that distributes, at a predetermined distribution ratio, torque output from the sub transmission to the front propeller shaft 38 and the rear propeller shaft 46; a differential lock device that restricts differential rotation between the front propeller shaft 38 and the rear propeller shaft 46; and a 2WD/4WD switching device that switches the drive mode between the two-wheel drive driving only the rear wheels 52 and the four-wheel drive driving all of the wheels (front wheels 44 and rear wheels 52). A high/low switch of the sub transmission, the differential lock device, and the 2WD/4WD switching device are electrically controlled by the in-vehicle control device 130. The transfer 36 may be of a type capable of electrically controlling the torque distribution ratio between the front propeller shaft 38 and the rear propeller shaft 46.

The vehicle 30 further includes an automatic braking system 80 in relation to autocruise running. The automatic braking system 80 electrically controls braking force i.e. brake oil pressure of wheel brakes 82*fl*, 82*fr*, 82*rl*, and 82*rr* disposed on the front wheels 44 and the rear wheels 52, respectively, in accordance with commands from the in-vehicle control device 130. Hereinafter, the wheel brakes 82*fl*, 82*fr*, 82*rl*, and 82*rr* are referred to simply as wheel brakes 82, if not particularly distinguished. By stepping on a brake pedal not shown, brake oil pressure is supplied via a brake master cylinder to the wheel brakes 82, so that the wheel brakes 82 mechanically generate braking force corresponding to the brake oil pressure i.e. brake operating force.

The vehicle 30 includes the in-vehicle control device 130 as a control device that executes various controls. The in-vehicle control device 130 is configured including, as necessary, a plurality of electronic control devices for engine control, for MG control, for oil pressure control, etc.

The in-vehicle control device 130 is fed with various signals, etc. that are based on detection values of corresponding sensors, respectively, disposed in the vehicle 30. The various signals, etc. include signals indicative of, for example, an engine rotation number $N_e$ i.e. the rotation speed of the engine 32, the turbine rotation number $N_t$ equal to the input rotation number $N_i$, the output rotation number $N_o$ corresponding to the vehicle velocity V, the MG rotation number $N_{mg}$, an accelerator opening $\theta_{acc}$ that is the amount of operation of an accelerator operating member such as an accelerator pedal and that indicates the amount of output demanded by the driver, a throttle valve opening $\theta_{th}$ i.e. the opening degree of an electronic throttle valve, a road surface gradient $\Phi$, a longitudinal acceleration $G_a$ and a lateral acceleration $G_b$ of the vehicle 30, the gear stage GS of the shift unit 64, an intervehicle distance $D_{is}$ to a preceding vehicle, autocruise setting information $A_{crui}$, and platoon participation information $C_{ara}$. The corresponding sensors include, for example, an engine rotation number sensor 90, a turbine rotation number sensor 92, an output rotation number sensor 94, an MG rotation number sensor 96, an accelerator opening sensor 98, a throttle valve opening sensor 100, a road surface gradient sensor 102, an acceleration sensor 104, a gear stage detector 106, an intervehicle distance sensor 108 such as a millimeter wave radar, an autocruise setting device 110, and a platoon participation device 112. The gear stage detector 106 can detect a gear stage GS from e.g. the control states of the engagement devices CB of the shift unit 64, but may identify the gear stage GS by calculating the gear ratio γ from the input rotation number $N_i$ and the output rotation number $N_o$.

The autocruise setting device 110 is a device that selects autocruise running performing constant-velocity running and follow-up running, as automatic driving automatically controlling the power sources SP, so as to run in a previously defined target running state without the need of the driver's acceleration/deceleration operation. That is, the vehicle 30 is capable of the autocruise running automatically controlling the engine 32 and the rotator MG in accordance with the target vehicle velocity $V_t$, etc., as well as manual driving in which the engine 32 and the rotator MG are controlled according to the driver's acceleration/deceleration operations using the accelerator pedal or the like. The autocruise setting device 110 is a device not only selecting the autocruise running but also setting the target vehicle velocity $V_t$, increasing/decreasing the target vehicle velocity $V_t$, and setting a target intervehicle distance $D_t$ during follow-up running that runs following a preceding vehicle. The autocruise setting device 110 is disposed on a steering wheel for example, to receive the target vehicle velocity $V_t$, the target intervehicle distance $D_t$, etc. entered as autocruise setting information $A_{crui}$ by the driver.

The platoon participation device 112 is a device operated when joining a platoon and running as the leading vehicle $12_{le}$ or the following vehicle $12_{fo}$, and receives information of, for example, whether to join as the leading vehicle $12_{le}$, whether to join as the following vehicle $12_{fo}$, and the running order in the case of joining as the following vehicle $12_{fo}$, that are entered as the platoon participation information $C_{ara}$ by the driver. The driver may enter, as the platoon participation information $C_{ara}$, transmission information containing e.g. the identification number by which the vehicles 30 can be individually identified and the number of the gear stages of the shift unit 64 mounted. However, the entry is unnecessary in the case where those pieces of platoon participation information are registered in advance in the in-vehicle control device 130 by initial setting or the like. In this embodiment, another vehicle mounted with a continuously variable transmission or a manual transmission, different from the vehicle 30, can also join a platoon as the platoon participating vehicle 12, with transmission information on the continuously variable transmission or the manual transmission also being set as the platoon participation information $C_{ara}$ in an in-vehicle control device of the vehicle linked with the server 20. The platoon participation device 112 is configured using, for example, a touch panel capable of touch input, but input may be made by using a terminal such as a smartphone owned by the driver. Platoon implementation information may be previously determined and set in the server 20 by a platoon manager, etc. so that the platoon implementation information is conveyed from the server 20 to target platoon participating vehicles 12 or their drivers, etc. The platoon implementation information includes date and time of platooning, and information on a plurality of platoon participating vehicles 12 that join a platoon, information on whether to be the leading vehicle $12_{le}$ or the following vehicle $12_{fo}$, and information on the running order of the following vehicles $12_{fo}$.

The in-vehicle control device 130 issues various command signals for controlling the devices (e.g. the engine 32, the rotator MG, the shift unit 64, the transfer 36, and the automatic braking system 80) disposed in the vehicle 30. The various command signals include, for example, an engine control command signal $S_e$ for controlling the engine 32, an MG control command signal $S_{mg}$ for controlling the rotator MG, a shift control command signal $S_{sh}$ for switching the gear stage GS of the shift unit 64, a transfer control command signal $S_{tf}$ for switching the power transmission state of the transfer 36, and an automatic braking control command signal $S_{br}$ for controlling the automatic braking system 80.

The in-vehicle control device 130 sends/receives various pieces of information I via the radio communication R to/from the server 20. For example, the in-vehicle control device 130 receives control information $I_c$ from the server 20 and sends vehicle information $I_v$ to the server 20. The control information $I_c$ includes, for example: information of a platooning flag i.e. a signal representing that platooning is in execution; the platoon implementation information; information indicative of the gear stage of the shift unit 64; and information indicative of the amount of regeneration, i.e., electric power generated by the rotator MG during regenerative operation. The vehicle information $I_v$ includes, for example: vehicle identification information identifying each of the platoon participating vehicles 12; information of the running order inclusive of the leading vehicle $12_{le}$; transmission information on the type, the number of gear stages, etc. of the shift unit 64 mounted thereon; information of a retardation $G_r$ i.e. the longitudinal acceleration $G_a$ during coasting of the vehicle 30; and information of the intervehicle distance $D_{is}$. The retardation $G_r$ is the absolute value of a negative longitudinal acceleration $G_a$. The in-vehicle control device 130 may send/receive various pieces of information interchanged between it and the server 20, via the radio communication R, to/from another platoon participating vehicle 12 different from the vehicle 30. A nonvolatile memory or the like for example included in the in-vehicle control device 130 may store information of vehicle specifications such as output characteristics of the engine 32, output characteristics of the rotator MG, and a net vehicle weight $WT_{vs}$.

To implement various controls in the vehicle 30, the in-vehicle control device 130 functionally includes a power source control unit 132 as power source control means, a transmission control unit 134 as transmission control means, an autocruise control unit 136 as autocruise control means, and a platooning control unit 138 as platooning control means.

The power source control unit 132 is a hybrid control unit as hybrid control means that works the engine 32 and the rotator MG in a cooperative manner to execute hybrid driving control, etc. The power source control unit 132 applies the accelerator opening $\theta_{acc}$ and the vehicle velocity V to a drive demand amount map for example, to calculate the driver's drive demand amount for the vehicle 30. The drive demand amount map represents previously defined relationships i.e. relationships found experimentally or by design in advance for storage therein. The drive demand amount is a demand value for the drive amount output from the vehicle 30. The drive amount is, for example, a driving force $F_r$, a driving torque $T_r$, etc. of the driving wheels DW, and the drive demand amount is, for example, a demanded driving force $F_{rdem}$, a demanded driving torque $T_{rdem}$, etc. of the driving wheels DW. Considering the power transmission losses, the accessory loads, the gear ratio γ of the shift unit 64, etc., the power source control unit 132 issues the engine control command signal $S_e$ controlling the engine 32 and the MG control command signal $S_{mg}$ controlling the rotator MG, e.g., so as to obtain torque of the power source SP required to achieve the demanded driving torque $T_{rdem}$.

For example, on the power transmission path between the rotator MG and the engine 32, the power transmission device 34 for HEV may include an engine connection/disconnection clutch for cutting off power transmission therebetween. In the case where the engine connection/disconnection clutch is disposed, the power source control unit 132 enables motor running, i.e. battery electric vehicle (BEV) running in which a vehicle runs using only the rotator MG as the power source SP with the clutch released and the engine 32 stopped. For example, in the case where the demanded driving torque $T_{rdem}$ can be achieved by only the output of the rotator MG, the power source control unit 132 establishes a BEV drive mode as the drive mode. The BEV drive mode is an electric drive mode that allows BEV running (=electric running). On the other hand, in the case where the demanded driving torque $T_{rdem}$ cannot be achieved when not using at least the output of the engine 32, the power source control unit 132 establishes an engine drive mode i.e. an HEV drive mode as the drive mode. The HEV drive mode is a hybrid drive mode enabling engine running, i.e. hybrid running (=HEV running) in which a vehicle runs using at least the engine 32 as the power source SP when the engine connection/disconnection clutch is engaged. On the other hand, even though the demanded driving torque $T_{rdem}$ can be achieved by only the output of the rotator MG, if the engine 32, etc. needs to be warmed up, the power source control unit 132 establishes the HEV drive mode as the drive mode.

Figure 5:
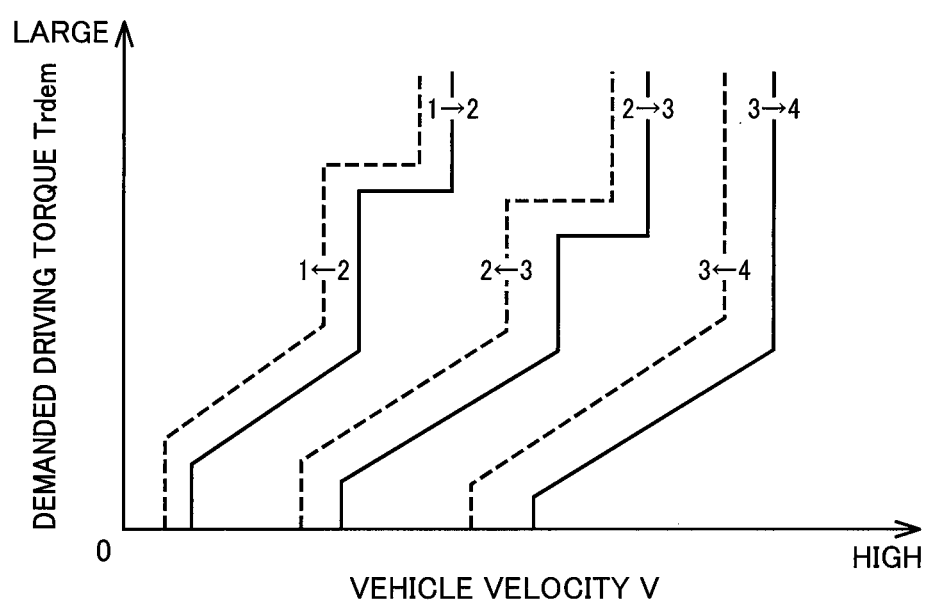
FIG. 5 is a diagram explaining an example of a shift map for use in shift control of the shift unit of FIG. 3.

The transmission control unit 134 determines shifting of the shift unit 64 e.g. by using a shift map representing previously defined relationships, and, as needed, issues a shift control command signal $S_{sh}$ for executing shift control of the shift unit 64. FIG. 5 shows an example of the shift map in the case of including the 4-speed transmission of FIG. 3 as the shift unit 64. The shift map of FIG. 5 represents predetermined relationships having shift lines for determining shifting of the shift unit 64 on two-dimensional coordinates with the vehicle velocity V and the demanded driving torque $T_{rdem}$ as variables. The shift lines include upshift lines (see solid lines) for determining upshifting and downshift lines (see broken lines) for determining downshifting. Numerals "1" to "4" in the diagram denote the first to fourth gear stages, respectively. In the shift map of FIG. 5, the vehicle velocity V may be substituted with e.g. the output rotation number $N_o$, while the demanded driving torque $T_{rdem}$ may be substituted with e.g. the demanded driving force $F_{rdem}$, the accelerator opening $\theta_{acc}$, or the throttle valve opening $\theta_{th}$.

The autocruise control unit 136 executes the autocruise running as the automatic driving. The autocruise running enables autonomous running without needing the driver's acceleration/deceleration operation. The autocruise control unit 136 executes constant-velocity running control for constant-velocity running at the target vehicle velocity $V_t$ set by the autocruise setting device 110 and follow-up running control for follow-up running keeping the target intervehicle distance $D_t$ set by the autocruise setting device 110. In the constant-velocity running control, the autocruise control unit 136 calculates a demanded driving torque $T_{rdem}$ necessary for running at the target vehicle velocity $V_t$, and, considering the power transmission losses, the accessory loads, the gear ratio γ of the shift unit 64, etc., issues the engine control command signal $S_e$ controlling the engine 32 and the MG control command signal $S_{mg}$ controlling the rotator MG, so as to obtain torque of the power source SP required to achieve the demanded driving torque $T_{rdem}$. In this case, the demanded driving torque $T_{rdem}$ is found by feedback control, feedforward control, or the like based on e.g. a difference between the target vehicle velocity $V_t$ and the actual vehicle velocity V. On the other hand, in the follow-up running control for follow-up running keeping the target intervehicle distance $D_t$ from the preceding vehicle, the autocruise control unit 136 figures out a demanded driving torque $T_{rdem}$ necessary for follow-up running with the intervehicle distance $D_{is}$ being equal to the target intervehicle distance $D_t$ and controls the engine torque $T_e$ and the MG torque so as to obtain the demanded driving torque $T_{rdem}$. The target intervehicle distance $D_t$ is variably set depending on e.g. the vehicle velocity V. In the case where the demanded driving torque $T_{rdem}$ is negative (minus) such as when the preceding vehicle decelerates, engine braking is activated by the engine 32 or regenerative braking is generated by the rotator MG, or if necessary, the braking is combined with braking force of the wheel brake 82 controlled by the automatic braking system 80, so that a negative demanded driving torque $T_{rdem}$ can be obtained. In this embodiment, a negative driving torque $T_r$ generated by the engine braking or the regenerative braking is referred to as a driven torque $T_{rr}$. Also during this autocruise running, the transmission control unit 134 executes shift control for switching the gear stage GS of the shift unit 64 in accordance with the shift conditions of e.g. the shift map of FIG. 5.

The platooning control unit 138 is involved in platooning control when the vehicle 30 joins platooning as the platoon participating vehicle 12. For example, the platooning control unit 138 sends the platoon participation information $C_{ara}$ to the server 20 to join the platoon and perform autocruise running controlled by the autocruise control unit 136. In the case of joining the platooning as the following vehicle $12_{fo}$, the follow-up running is performed keeping a predetermined intervehicle distance $D_{is}$, e.g., target intervehicle distance $D_t$ from the preceding vehicle under the follow-up running control. In the case where the vehicle 30 is capable of unmanned running or running by automatic driving enabling autonomous running without needing the driver's acceleration/deceleration operation and steering operation, the platooning control unit 138 may allow the vehicle 30 to join the platooning with unmanned running or with running by automatic driving.

The server 20 functionally includes a platoon management control unit 22 as platoon management control means. The platoon management control unit 22 determines whether platooning is in execution. For example, the platoon management control unit 22 determines whether platooning is in execution, based on various pieces of information I interchanged between it and the platoon participating vehicles 12. If determined that platooning is in execution, the platoon management control unit 22 acquires vehicle information $I_v$ needed for platooning management, drive amount management, etc. from each of the platoon participating vehicles 12 and sends control information $I_c$ needed for platooning control, drive amount control, etc. to each of the platoon participating vehicles 12.

In the case where platooning is executed repeating acceleration running, coasting, etc. so as to keep the target vehicle velocity $V_t$ and/or the target intervehicle distance $D_t$, if during coasting, the retardation $G_r$ differs due to the difference of the current vehicle state in each of the platoon participating vehicles 12, the intervehicle distance $D_{is}$ tends to change easily. Even though the platoon participating vehicles 12 have substantially the same retardation $G_r$ during coasting, the intervehicle distance $D_{is}$ may change due to the difference in running resistance between the platoon participating vehicles 12. The change in the intervehicle distance $D_{is}$ is suppressed by the control keeping the target intervehicle distance $D_t$. However, since the control keeping the target intervehicle distance $D_t$ is activated after the occurrence of change in the intervehicle distance $D_{is}$, it is conceivable to leave the vehicle in a state where the intervehicle distance $D_{is}$ is originally difficult to change when switched to coasting, before entering coasting. Since the driver is given a sense of security if the intervehicle distance $D_{is}$ changes to become longer, it is desirable to prevent the intervehicle distance $D_{is}$ from changing to become shorter.

The vehicle control device 150 thus performs driven torque regulation control $CT_{rr}$ that controls the driven torque $T_{rr}$ of each of the platoon participating vehicles 12 during execution of platooning so that the platoon participating vehicles 12 are aligned from the leading vehicle $12_{le}$ in ascending order of the estimated value of the retardation $G_r$. That is, during execution of platooning, the vehicle control device 150 performs the driven torque regulation control $CT_{rr}$, preparing for coasting, before entering coasting. In this embodiment, the estimated value of the retardation $G_r$ is referred to as estimated retardation $G_{re}$.

Specifically, the vehicle control device 150 figures out, for each of the platoon participating vehicles 12, the estimated retardation $G_{re}$ based on the driven torque $T_{rr}$ generated when each of the platoon participating vehicles 12 coasts solely in the current vehicle state. For example, in the platoon participating vehicle 12 mounted with the engine 32, the in-vehicle control device 130 calculates the driven torque $T_{rr}$ obtained by the engine braking when entering coasting based on the current engine rotation number $N_e$. In the platoon participating vehicle 12 mounted with the rotator MG, the in-vehicle control device 130 calculates the driven torque $T_{rr}$ obtained by the regenerative braking when entering coasting in the current vehicle state. In the platoon participating vehicle 12 mounted with both the engine 32 and the rotator MG, the in-vehicle control device 130 may figure out a total driven torque $T_{rr}$, i.e., the sum of the driven torque $T_{rr}$ obtained by the engine braking and the driven torque $T_{rr}$ obtained by the regenerative braking. The in-vehicle control device 130 calculates the estimated retardation $G_{re}$ based on the driven torque $T_{rr}$ and a running resistance RL occurring when coasting alone in the current vehicle state. In the case of steady running on a flat road, the running resistance RL is a total value $(=F_a+F_{rl})$ [N] of an air resistance $F_a$ as a function of the vehicle velocity V and a rolling resistance $F_{rl}$ as a function of a vehicle weight $WT_v$ that is a gross weight inclusive of the net vehicle weight $WT_{vs}$, passenger weight, and so forth. The in-vehicle control device 130 applies the current vehicle velocity V and the vehicle weight $WT_v$ to e.g. a running resistance map representing previously defined relationships, to thereby calculate the running resistance RL occurring when the vehicle coasts alone in the current vehicle state. In this manner, the vehicle control device 150 figures out the estimated retardation $G_{re}$ based on the driven torque $T_{rr}$ of each of the platoon participating vehicles 12, based on the vehicle weight $WT_v$.

The vehicle control device 150 may calculate the estimated retardation $G_{re}$ based on the driven torque $T_{rr}$ of each of the platoon participating vehicles 12, posterior to the start of platooning, i.e., when platooning is in execution, or anterior to the execution of platooning. Calculation of the estimated retardation $G_{re}$ anterior to the execution of platooning enables a platoon to be formed utilizing information of the estimated retardation $G_{re}$ when starting platooning.

The driven torque regulation control $CT_{rr}$ is performed during execution of platooning, but is not performed during non-execution of platooning. Hence, the vehicle control device 150 determines whether platooning has been started.

If determined that platooning has been started, i.e., when platooning is in execution, the vehicle control device 150 acquires, for each of the platoon participating vehicles 12, information of the estimated retardation $G_{re}$ based on the driven torque $T_{rr}$ occurring when the vehicle coasts solely in the current vehicle state, to perform the driven torque regulation control $CT_{rr}$.

The estimated retardation $G_{re}$ may not be calculable in any of the platoon participating vehicles 12. In this case, the driven torque regulation control $CT_{rr}$ cannot be performed. For this reason, if determined that platooning has been started, the vehicle control device 150 determines whether it is possible to acquire i.e. grasp the estimated retardation $G_{re}$ based on the driven torque $T_{rr}$ of each of the platoon participating vehicles 12. If determined that the estimated retardation $G_{re}$ is graspable, the vehicle control device 150 performs the driven torque regulation control $CT_{rr}$.

In the driven torque regulation control $CT_{rr}$, the vehicle control device 150 grasps the platoon participating vehicle 12 capable of changing the estimated retardation $G_{re}$ by regulation of the driven torque $T_{rr}$ in the current vehicle state and regulates i.e. changes the driven torque $T_{rr}$ so as to be able to form a platoon with even difference in the estimated retardation $G_{re}$ based on the driven torque $T_{rr}$ between the preceding and following vehicles of the platoon participating vehicles 12 while considering the changeable range of the estimated retardation $G_{re}$. The vehicle control device 150 then determines the alignment order of the platoon participating vehicles 12, on the basis of the estimated retardation $G_{re}$ based on the driven torque $T_{rr}$ determined. The vehicle control device 150 forms a platoon so that the vehicle has a larger estimated retardation $G_{re}$ according as it goes rearward from the leading vehicle $12_{le}$ with the least estimated retardation $G_{re}$.

In the platoon participating vehicle 12 mounted with the engine 32 and the shift unit 64, the in-vehicle control device 130 controls the driven torque $T_{rr}$ obtained from engine braking by the engine 32, through change of the gear ratio γ of the shift unit 64. That is, the in-vehicle control device 130 can regulate the driven torque $T_{rr}$ to change the estimated retardation $G_{re}$ by changing the gear ratio γ of the shift unit 64. In the case of including the 4-speed transmission of FIG. 3 as the shift unit 64, the in-vehicle control device 130 can adjust the estimated retardation $G_{re}$ in four discontinuous stages by regulating the driven torque $T_{rr}$ from the engine 32. In the case of including the continuously variable transmission as the shift unit 64, the in-vehicle control device 130 can set a continuous estimated retardation $G_{re}$ by regulating the driven torque $T_{rr}$ from the engine 32.

In the platoon participating vehicle 12 having the rotator MG mounted thereon, the in-vehicle control device 130 controls the driven torque $T_{rr}$ obtained by regenerative braking from the rotator MG, by changing the amount of regeneration of the rotator MG. That is, the in-vehicle control device 130 can regulate the driven torque $T_{rr}$ to change the estimated retardation $G_{re}$ by changing the amount of regeneration of the rotator MG. In the case of including the rotator MG as the power source SP, the in-vehicle control device 130 can set the continuous estimated retardation $G_{re}$ by regulating the driven torque $T_{rr}$ arising from the rotator MG.

Figure 6:
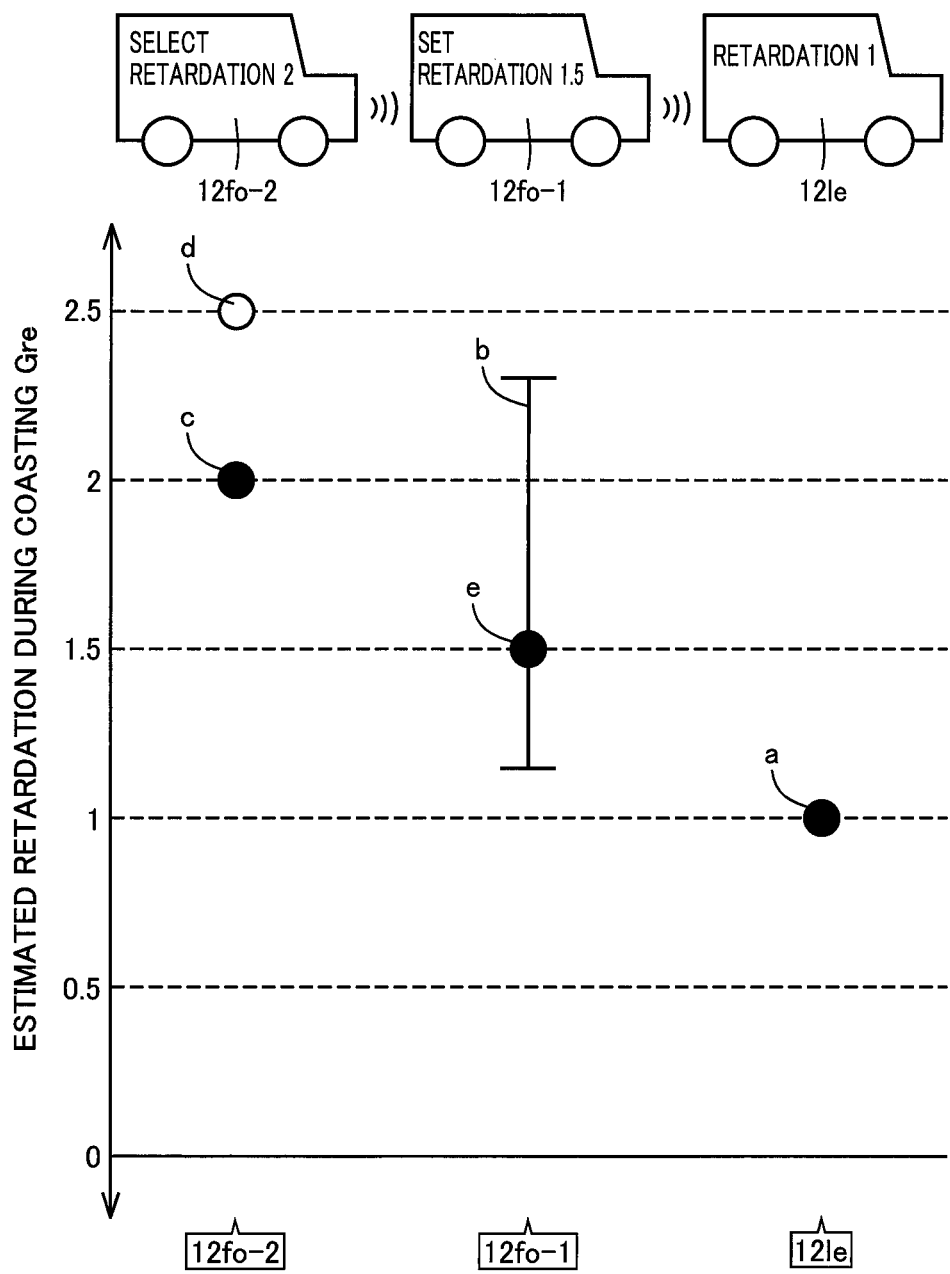
FIG. 6 is a diagram showing an example of retardation setting prepared for when coasting during platooning.

FIG. 6 is a diagram showing an example of retardation setting prepared for when coasting during platooning. In FIG. 6, point a indicates an estimated retardation $G_{re}$ that the leading vehicle 12le can set in the current vehicle state. The range of solid line b indicates a range of the estimated retardation $G_{re}$ that the following vehicle $12_{fo-1}$ can set in the current vehicle state. The range of solid line b corresponds to e.g. a range in which the continuously variable transmission can shift or a range in which the amount of regeneration of the rotator MG can change. Points c and d each indicate an estimated retardation $G_{re}$ that the following vehicle $12_{fo-2}$ can set in the current vehicle state. Point d represents the state of the stepped transmission downshifted from point c. Even though the least estimated retardation $G_{re}$ (see point c) has been set among estimated retardations $G_{re}$ that the following vehicle $12_{fo-2}$ can set, it cannot fall below the estimated retardations $G_{re}$ of the preceding leading vehicle $12_{le}$ and following vehicle $12_{fo-1}$, whereupon "retardation 2" corresponding to the least estimated retardation $G_{re}$ is selected as the estimated retardation $G_{re}$ of the following vehicle $12_{fo-2}$. The estimated retardation $G_{re}$ of the following vehicle $12_{fo-1}$ can be set on the basis of "retardation 1" set as the estimated retardation $G_{re}$ of the leading vehicle $12_{le}$ and "retardation 2" set as the estimated retardation $G_{re}$ of the following vehicle $12_{fo-2}$. In the embodiment of FIG. 6, "retardation 1.5" is set as the estimated retardation $G_{re}$ of the following vehicle $12_{fo-1}$, "retardation 1.5" being an estimated retardation $G_{re}$ (see point e) intermediate between those of the leading vehicle $12_{le}$ and the following vehicle $12_{fo-2}$. Through execution of the above driven torque regulation control $CT_{rr}$, it is possible to restrain or prevent the intervehicle distance $D_{is}$ from becoming short during coasting. The platoon of FIG. 6 is formed while regulating the driven torques $T_{rr}$, based on an alignment order and estimated retardations $G_{re}$ of the platoon participating vehicles 12 obtained, when starting platooning, by calculation of estimated retardations $G_{re}$ that the vehicles can set and determination of the alignment order and the estimated retardations $G_{re}$. The platoon of FIG. 6 is formed also by changing the original alignment order of the platoon participating vehicles 12 while regulating the driven torques $T_{rr}$, based on another alignment order and estimated retardations $G_{re}$ determined during platooning. The platoon of FIG. 6 is formed also by regulating the driven torques $T_{rr}$, based on an alignment order and estimated retardations $G_{re}$ determined during platooning, with the alignment order unchanged.

Figure 7:
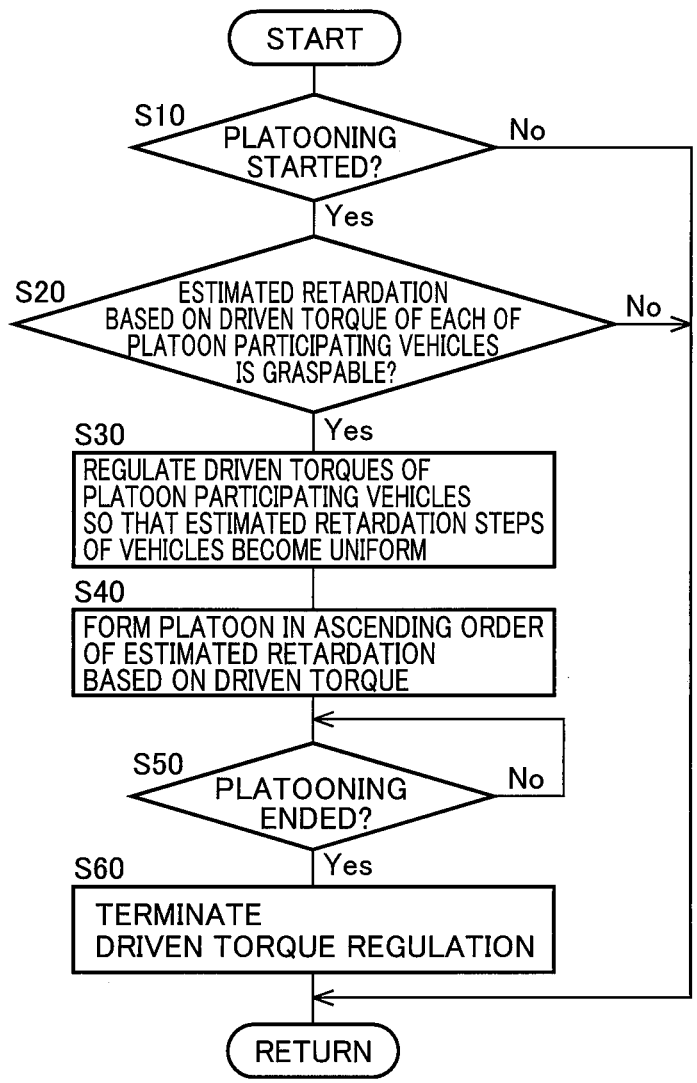
FIG. 7 is a flowchart explaining a principal part of a control procedure of the vehicle control device, the flowchart explaining control actions for restraining the intervehicle distance between the platoon participating vehicles from becoming short at the time of coasting during platooning.

FIG. 7 is a flowchart explaining a principal part of a control procedure of the vehicle control device 150, the flowchart explaining control actions for restraining the intervehicle distance $D_{is}$ between the platoon participating vehicles 12 from becoming short at the time of coasting during platooning, the control actions being executed repeatedly for example.

In FIG. 7, steps of the flowchart correspond to the functions of the vehicle control device 150. At step S10 (hereinafter, the term "step" will be omitted), it is determined whether platooning has been started. If determination at S10 is negative, this routine is brought to an end. If determination at S10 is affirmative, it is determined at S20 whether the estimated retardation $G_{re}$ based on the driven torque $T_{rr}$ of each of the platoon participating vehicles 12 can be grasped. If determination at S20 is negative, this routine is brought to an end. If determination at S20 is affirmative, the driven torques $T_{rr}$ of the platoon participating vehicles 12 are regulated so that steps of the estimated retardations $G_{re}$ of the vehicles become uniform. Then at S40, a platoon is formed in ascending order of the estimated retardation $G_{re}$ based on the driven torque $T_{rr}$, i.e., such that the estimated retardation $G_{re}$ increases according as it goes rearward. Next, it is determined at S50 whether the platooning has ended. If determination at S50 is negative, S50 is executed repeatedly. If determination at S50 is affirmative, the driven torque regulation control $CT_{rr}$ comes to an end.

As described above, according to this embodiment, while platooning is in execution, for each of the platoon participating vehicles 12 there is acquired information of the estimated retardation $G_{re}$ based on the driven torque $T_{rr}$ occurring when the vehicle coasts solely in the current vehicle state, and the driven torque $T_{rr}$ of each of the platoon participating vehicles 12 is controlled so that the alignment order of the platoon participating vehicles 12 becomes ascending order of the estimated retardation $G_{re}$ in sequence from the leading vehicle $12_{le}$, whereby the actual retardation $G_r$ is restrained from decreasing even though the following vehicle $12_{fo}$ can have an air resistance smaller than that of the preceding vehicle. It is thus possible to restrain the intervehicle distance $D_{is}$ between the platoon participating vehicles 12 from becoming short at the time of coasting during platooning.

According to this embodiment, in the platoon participating vehicle 12 including the engine 32 and the shift unit 64, the driven torque $T_{rr}$ obtained by engine braking is controlled by changing the gear ratio γ of the shift unit 64, whereupon the driven torque $T_{rr}$ can easily be controlled so that the alignment order of the platoon participating vehicles 12 becomes ascending order of the estimated retardation $G_{re}$ in sequence from the leading vehicle $12_{le}$.

According to this embodiment, in the platoon participating vehicle 12 including the rotator MG, the driven torque $T_{rr}$ obtained by regenerative braking is controlled by changing the amount of regeneration of the rotator MG, whereupon the driven torque $T_{rr}$ can easily be controlled so that the alignment order of the platoon participating vehicles 12 becomes ascending order of the estimated retardation $G_{re}$ in sequence from the leading vehicle $12_{le}$.

According to this embodiment, since the estimated retardation $G_{re}$ based on the driven torque $T_{rr}$ of each of the platoon participating vehicles 12 is calculated prior to the execution of platooning, the platoon can be formed considering the changeable range of the driven torque $T_{rr}$ when starting the platoon. This facilitates the driven torque $T_{rr}$ control allowing the alignment order of the platoon participating vehicles 12 to become ascending order of the estimated retardation $G_{re}$ in sequence from the leading vehicle $12_{le}$.

According to this embodiment, since the estimated retardation $G_{re}$ based on the driven torque $T_{rr}$ of each of the platoon participating vehicles 12 is calculated on the basis of the vehicle weight $WT_v$, the estimated retardation $G_{re}$ of each of the platoon participating vehicles 12 is properly figured out corresponding to the passenger weight.

Another embodiment of the present invention will then be described. In description which follows, portions common to the embodiments will be designated by the same reference numerals and will not again be described.

Second Embodiment

In the above first embodiment, the estimated retardation $G_{re}$ has been calculated that reflects the running resistance RL generated when coasting alone. The air resistance $F_a$ contained in the running resistance RL decreases in sequence from the leading vehicle $12_{le}$. For this reason, in the following vehicles $12_{fo}$, the estimated retardation $G_{re}$ becomes smaller by the decrease of the air resistance $F_a$ than solo running.

Thus, in this embodiment, the vehicle control device 150 figures out the estimated retardation $G_{re}$ taking account of the difference in the air resistance $F_a$ that arises from the alignment order of the platoon participating vehicles 12. During execution of platooning, the vehicle control device 150 acquires information of the estimated retardation $G_{re}$ taking account of the difference in the air resistance Fa arising from the alignment order of the platoon participating vehicles 12, to perform the driven torque regulation control $CT_{rr}$.

Figure 8:
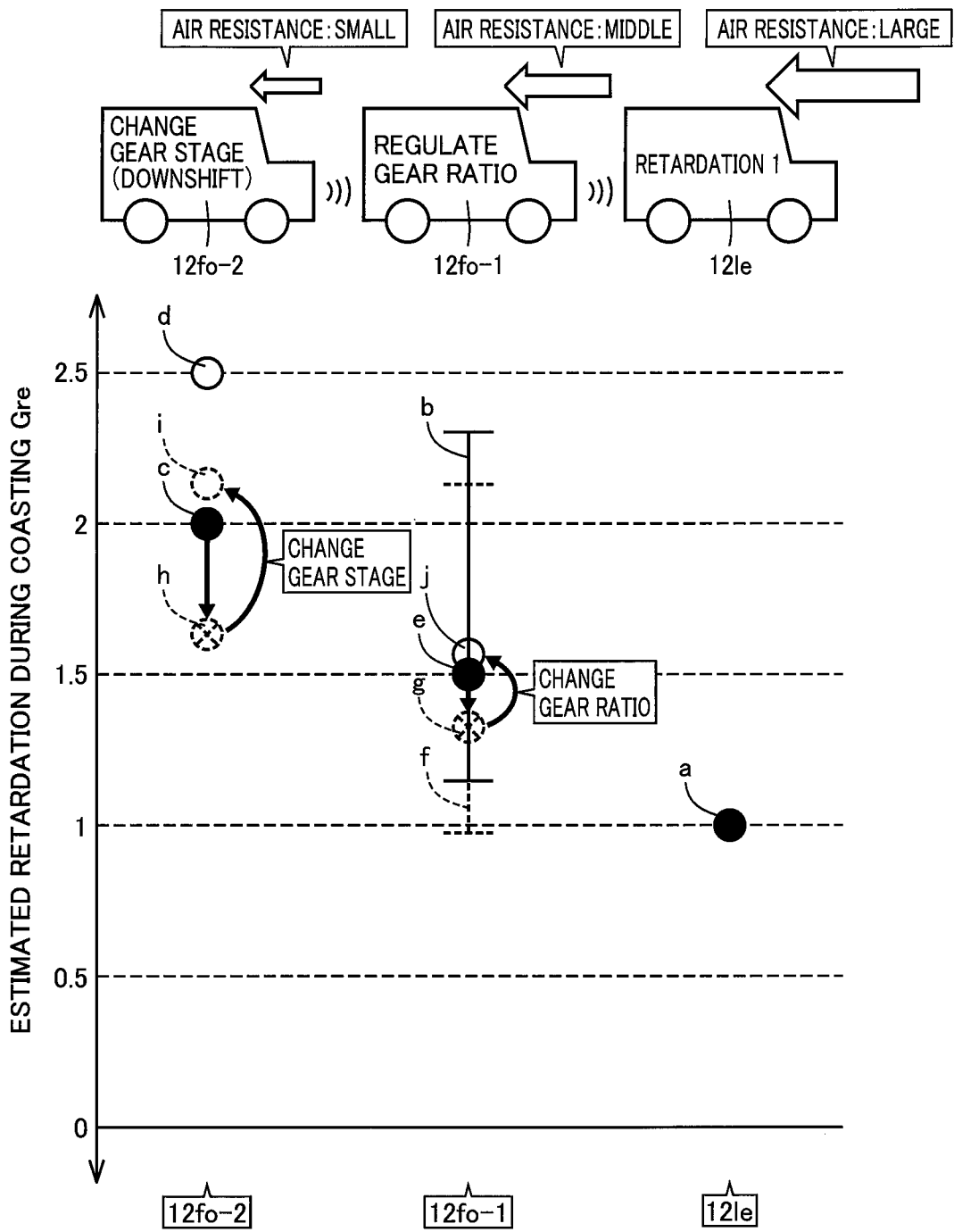
FIG. 8 is a diagram showing an example of retardation setting considering the air resistance, prepared for when coasting during platooning.

FIG. 8 is a diagram showing an example of retardation setting considering the air resistance $F_a$, prepared for when coasting during platooning. In FIG. 8, point a, the range of solid line b, and points c to e are the same as point a, the range of solid line b, and points c to e, respectively, of FIG. 6. The leading vehicle $12_{le}$ has the maximum air resistance $F_a$, with the following vehicles $12_{fo-1}$, $12_{fo-2}$, etc. having smaller air resistances $F_a$ in descending order. Since the air resistance $F_a$ of the leading vehicle $12_{le}$ is the same as the air resistance $F_a$ experienced when solo coasting, the estimated retardation $G_{re}$ set in the leading vehicle $12_{le}$ is unchanged from "retardation 1" designated at point a. Since the air resistance $F_a$ of the following vehicle $12_{fo-1}$ decreases from the air resistance $F_a$ generated when solo coasting, the range of the estimated retardation $G_{re}$ settable in the following vehicle $12_{fo-1}$ shifts downward as a whole, by the decrease of the air resistance $F_a$, from the range of solid line b, as indicated by broken line f The estimated retardation $G_{re}$ set at "retardation 1.5" also becomes smaller by the decrease of the air resistance $F_a$ (see point g). Since the air resistance $F_a$ of the following vehicle $12_{fo-2}$ further decreases than that of the following vehicle $12_{fo-1}$ from the air resistance $F_a$ generated when solo coasting, the estimated retardation $G_{re}$ settable in the following vehicle $12fo$-2 becomes smaller, as indicated by points h and i, by the decrease of the air resistance $F_a$, from points c and d, respectively. Although, even if the estimated retardations $G_{re}$ of the leading vehicle $12_{le}$, the following vehicles $12_{fo-1}$ and $12_{fo-2}$ are set at points a, g, and h, respectively, a certain difference can exist between those estimated retardation $G_{re}$, the difference becomes smaller as compared with the case of setting at points a, e, and c. Thus, in the following vehicle $12_{fo-2}$, the stepped transmission is downshifted to change the gear stage, to thereby set the estimated retardation $G_{re}$ of the following vehicle $12_{fo-2}$ at point i. The estimated retardation $G_{re}$ of the following vehicle $12_{fo-1}$ is set to an estimated retardation $G_{re}$ (see point j) intermediate between points a and i. This ensures the difference equal to that between the estimated retardations $G_{re}$ in the case of setting at points a, e, and c. The embodiment enables the estimated retardation $G_{re}$ increasing as it goes rearward from the leading vehicle $12_{le}$ to be set without changing the estimated retardation $G_{re}$ in the following vehicle $12_{fo-2}$. If the estimated retardation $G_{re}$ increasing as it goes rearward from the leading vehicle $12_{le}$ cannot be set, control is again performed to obtain the estimated retardation $G_{re}$ increasing as it goes rearward from the leading vehicle $12_{le}$, by changing the estimated retardation $G_{re}$ of any vehicle or by changing the alignment order. Calculation of the estimated retardation $G_{re}$ considering the air resistance Fa may be performed before the start of platooning or may be applied appropriately to the driven torque regulation control $CT_{rr}$ by taking account of the difference from the estimated retardation $G_{re}$ assumed during platooning. The estimated retardation $G_{re}$ assumed is the estimated retardation $G_{re}$ calculated using the air resistance $F_a$ generated when solo coasting.

As described above, according to this embodiment, information of the estimated retardation $G_{re}$ is acquired that takes account of the difference in the air resistance $F_a$ arising from the alignment order of the platoon participating vehicles 12, the actual retardation $G_r$ is further restrained or prevented from diminishing even if the following vehicle $12_{fo}$ has a smaller air resistance $F_a$ than the preceding vehicle has.

Third Embodiment

In the first and the second embodiments, the intervehicle distance $D_{is}$ between any ones of the platoon participating vehicles 12 may become sufficiently longer than the target intervehicle distance $D_t$ due to the execution of the driven torque regulation control $CT_{rr}$ when coasting during platooning. Such a case, the driven torque regulation control $CT_{rr}$ need not be performed.

Thus, in this embodiment, the driven torque regulation control $CT_{rr}$ is brought to an end if, as a result of the driven torque $T_{rr}$ control i.e. driven torque regulation control $CT_{rr}$, the intervehicle distance $D_{is}$ between any ones of the platoon participating vehicles 12 exceeds a predetermined end determination threshold value $D_{end}$ longer than a predetermined intervehicle distance $D_{is}$ e.g. the target intervehicle distance $D_t$. The predetermined end determination threshold value $D_{end}$ is a previously defined threshold value for determining that the intervehicle distance $D_{is}$ has become sufficiently longer than the target intervehicle distance $D_t$ during coasting for example.

Figure 9:
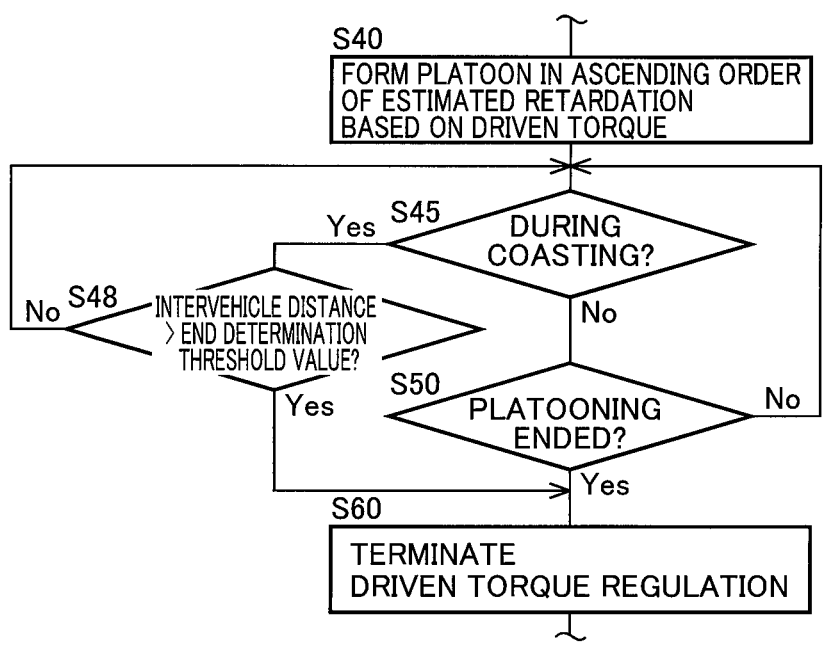
FIG. 9 is a flowchart explaining a principal part of a control procedure of the vehicle control device, the flowchart depicting another embodiment different from the flowchart of FIG. 7, the flowchart explaining control actions for restraining the intervehicle distance between the platoon participating vehicles from decreasing at the time of coasting during platooning.

FIG. 9 is a flowchart explaining a principal part of a control procedure of the vehicle control device 150, the flowchart explaining control actions for restraining the intervehicle distance $D_{is}$ between the platoon participating vehicles 12 from becoming short at the time of coasting during platooning, the control actions being executed repeatedly for example. FIG. 9 depicts another embodiment different from the flowchart of FIG. 7. In FIG. 9, differences from FIG. 7 are mainly described.

In FIG. 9, steps of the flowchart correspond to the functions of the vehicle control device 150. Subsequent to S40 described above, it is determined at S45 whether the vehicle is coasting. If determination at S45 is affirmative, it is determined at S48 whether the intervehicle distance $D_{is}$ has exceeded the predetermined end determination threshold value $D_{end}$. If determination at S48 is negative, S45 described above is executed. If determination at S45 is negative, S50 described above is executed. If determination at S50 is negative, S45 described above is executed. If determination at S48 is affirmative or if determination at S50 is affirmative, then S60 described above is executed.

As described above, according to this embodiment, if as a result of the driven torque regulation control $CT_{rr}$, the intervehicle distance $D_{is}$ between any ones of the platoon participating vehicles 12 has exceeded the predetermined end determination threshold value $D_{end}$, the driven torque regulation control $CT_{rr}$ is brought to an end, whereupon when reaching the situation where the reduction of the intervehicle distance $D_{is}$ between the platoon participating vehicles 12 is avoided, the intervehicle distance $D_{is}$ restrained from becoming further longer.

Although the embodiments of the present invention have hereinbefore been described with reference to the drawings, the present invention is applicable also to other modes.

For example, the second and the third embodiments may be executed in combination with the first embodiment.

In the above embodiments, some or all of the steps of the flowcharts of FIGS. 7 and 9 may be executed by the server 20 that the vehicle control device 150 includes. Some or all of the steps of the flowcharts of FIGS. 7 and 9 may be executed by the in-vehicle control device 130 that the vehicle control device 150 includes.

It should be understood that the above are mere embodiments and that the present invention can be carried out in modes variously altered or modified based on the knowledge of those skilled in the art.

12: platoon participating vehicle
$12_{le}$: leading vehicle (platoon participating vehicle)
$12_{fo}$ ($12_{fo-1}$, $12_{fo-2}$, $12_{fo-n}$): following vehicle (platoon participating vehicle)
20: server (vehicle control device)
32: engine (power source)
44: front wheel (driving wheel)
52: rear wheel (driving wheel)
64: shift unit (automatic transmission)
130: in-vehicle control device (vehicle control device)
150: vehicle control device
DW: driving wheel
MG: rotator (power source)
R: radio communication
SP: power source

The invention claimed is:

1. A vehicle control device connecting platoon participating vehicles to one another via radio communication, to control platooning of the platoon participating vehicles, the platoon participating vehicles including a leading vehicle and following vehicles that perform automatic follow-up running in line with a predetermined intervehicle distance from the leading vehicle,
during execution of the platooning, the vehicle control device acquiring, for each of the platoon participating vehicles, information of an estimated value of retardation based on a driven torque generated when coasting solely in its current vehicle state, the vehicle control device controlling the driven torque of each of the platoon participating vehicles, such that the platoon participating vehicles align in ascending order of the estimated value of retardation increasing rearward in sequence from the leading vehicle, and such that a difference in the estimated value of retardation between preceding and following vehicles of the platoon participating vehicles is even.

2. The vehicle control device of claim 1, wherein
each of the platoon participating vehicles includes an engine as a power source and an automatic transmission transmitting power of the engine to driving wheels, and
the vehicle control device controls the driven torque obtained from engine braking caused by friction of the engine, by changing a gear ratio of the automatic transmission, such that the difference in the estimated value of retardation between the preceding and following vehicles of the platoon participating vehicles is even.

3. The vehicle control device of claim 1, wherein
each of the platoon participating vehicles includes a rotator as a power source, and
the vehicle control device controls the driven torque obtained from regenerative braking caused by regenerative operation of the rotator, by changing amount of regeneration of the rotator, such that the difference in the estimated value of retardation between the preceding and following vehicles of the platoon participating vehicles is even.

4. The vehicle control device of claim 1, wherein
the vehicle control device acquires information of the estimated value of retardation that takes account of difference in air resistance occurring from order in which the platoon participating vehicles align.

5. The vehicle control device of claim 1, wherein
prior to execution of the platooning, the vehicle control device figures out the estimated value of retardation that is based on the driven torque of each of the platoon participating vehicles.

6. The vehicle control device of claim 1, wherein
based on vehicle weight, the vehicle control device figures out the estimated value of retardation that is based on the driven torque of each of the platoon participating vehicles.

7. The vehicle control device of claim 1, wherein
the vehicle control device brings control of the driven torque to an end in case that, as a result of the control of the driven torque, an intervehicle distance between any ones of the platoon participating vehicles exceeds a predetermined end determination threshold value greater than the predetermined intervehicle distance.

\* \* \* \* \*